J. J. McKINNON.
Potato-Digger.
No. 162,489.
Patented April 27, 1875
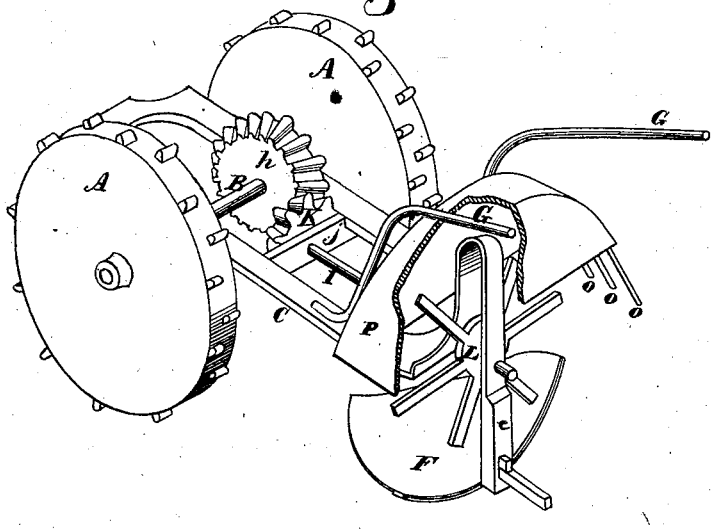
Witnesses
Geo. H. Strong
Jno. L. Boone
Inventor
Jas. J. McKinnon
by Dewey &
Atty

UNITED STATES PATENT OFFICE.

JAMES J. McKINNON, OF SAN FRANCISCO, CALIFORNIA.

IMPROVEMENT IN POTATO-DIGGERS.

Specification forming part of Letters Patent No. 162,489, dated April 27, 1875; application filed March 17, 1875.

*To all whom it may concern:*

Be it known that I, JAMES J. McKINNON, of San Francisco city and county, State of California, have invented an Improved Potato-Digger; and I do hereby declare the following description and accompanying drawings are sufficient to enable any person skilled in the art or science to which it most nearly appertains to make and use my said invention or improvement without further invention or experiment.

My improved potato-digger is constructed as follows, reference being had to the accompanying drawing, in which—

Figure 1 is a perspective view of my digger.

A A are the bearing-wheels, the rims of which are provided with spurs or spines, in the ordinary way of constructing the wheels of agricultural implements. These wheels are made fast to the opposite ends of the axle B, so that the axle turns with them. The forward end of the frame C extends over the axle, being supported by boxes, in which the axle turns. The rear end of the frame C is bent in the form of an inverted U, as shown, and the rear leg of the inverted U extends down to the ground, so as to form a standard for the shovel or plow F, which lifts the potatoes out of the ground. The shovel F is secured to the lower end of the standard or leg e at the desired angle and by any convenient means, so that it can be forced into the ground. Handles G G, similar to plow-handles, are secured to the rear end of the frame C, by means of which a person walking in rear of the plow can raise or lower the rear end of the frame at will, in order to force the plow into the ground or raise it out. The plow F is made in the form of a shovel or scoop, with a curved upper surface. A bevel-wheel, h, is secured to the axle B inside of the frame C, so that it turns with the axle. A shaft, I, has its rear end supported in the leg or standard e above the plow, and extends along under the frame to a cross-bar, j, of the frame, in which its forward end is supported. To the forward end of this shaft a bevel-pinion, k, is secured, so as to engage with the bevel-wheel h. To the rear end of the shaft I, inside of the bend or inverted U of the frame, I secure a four-armed wheel, L, the arms of which are long enough to pass close to the upper concave surface of the shovel or plow. When the machine moves forward this shaft I is rotated by the bevel-gears h k, and, consequently, the wheel L is caused to rotate above the plow or shovel, and at right angles to the travel of the machine.

When the shovel or plow is forced into the ground under the potato-hills, and drawn along the potato-row, it will lift the hills of potatoes, and carry them over the rear end of the shovel; but the revolving arms of the wheel L will strike the furrow as it is lifted into the hollow of the shovel, and thus throw the potatoes and dirt out to one side of the furrow, leaving the potatoes upon the surface of the ground, so that they can be easily picked up.

P is a shield or fender, which I secure to the rear end of the frame C, over the U-shaped portion, so as to prevent the wheel L from throwing the dirt in the face of the person who holds the handles. To the end of this shield, on the side to which the dirt and potatoes will be thrown, I secure fingers o o o, which project downward toward the ground. These fingers serve to stop the potatoes, and leave them on a line upon the ground, while the dirt and small clods will pass through them.

This machine is quite simple, and has power to be very effective in unearthing potatoes, and leaving them in a position ready to be picked up.

Having thus described my invention, what I claim, and desire to secure by Letters Patent, is—

1. In a potato-digger, the frame C, with its inverted U-shaped rear end arranged to form the standard or leg e, and plow or shoe F, in combination with the longitudinal shaft I and radial wheel L, all combined and arranged to operate substantially as and for the purpose specified.

2. In combination with the plow F and wheel L, the guard P, with its downward-projecting bars or fingers o o o o, substantially as and for the purpose described.

In witness whereof I hereunto set my hand and seal.

JAMES J. McKINNON. [L. S.]

Witnesses:
GEO. H. STRONG,
JNO. L. BOONE.